Figure 3:
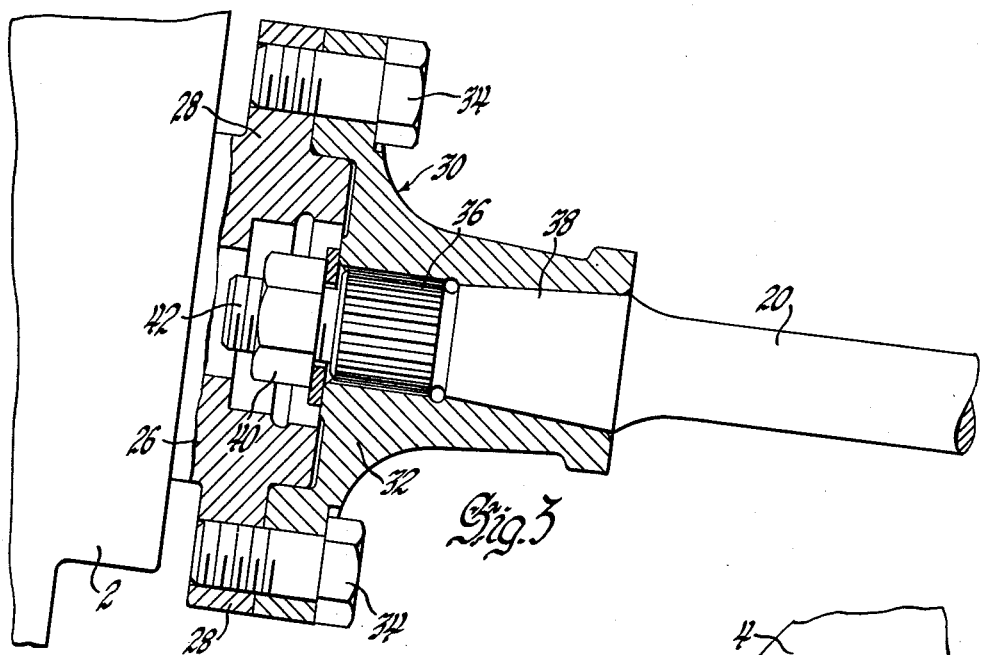

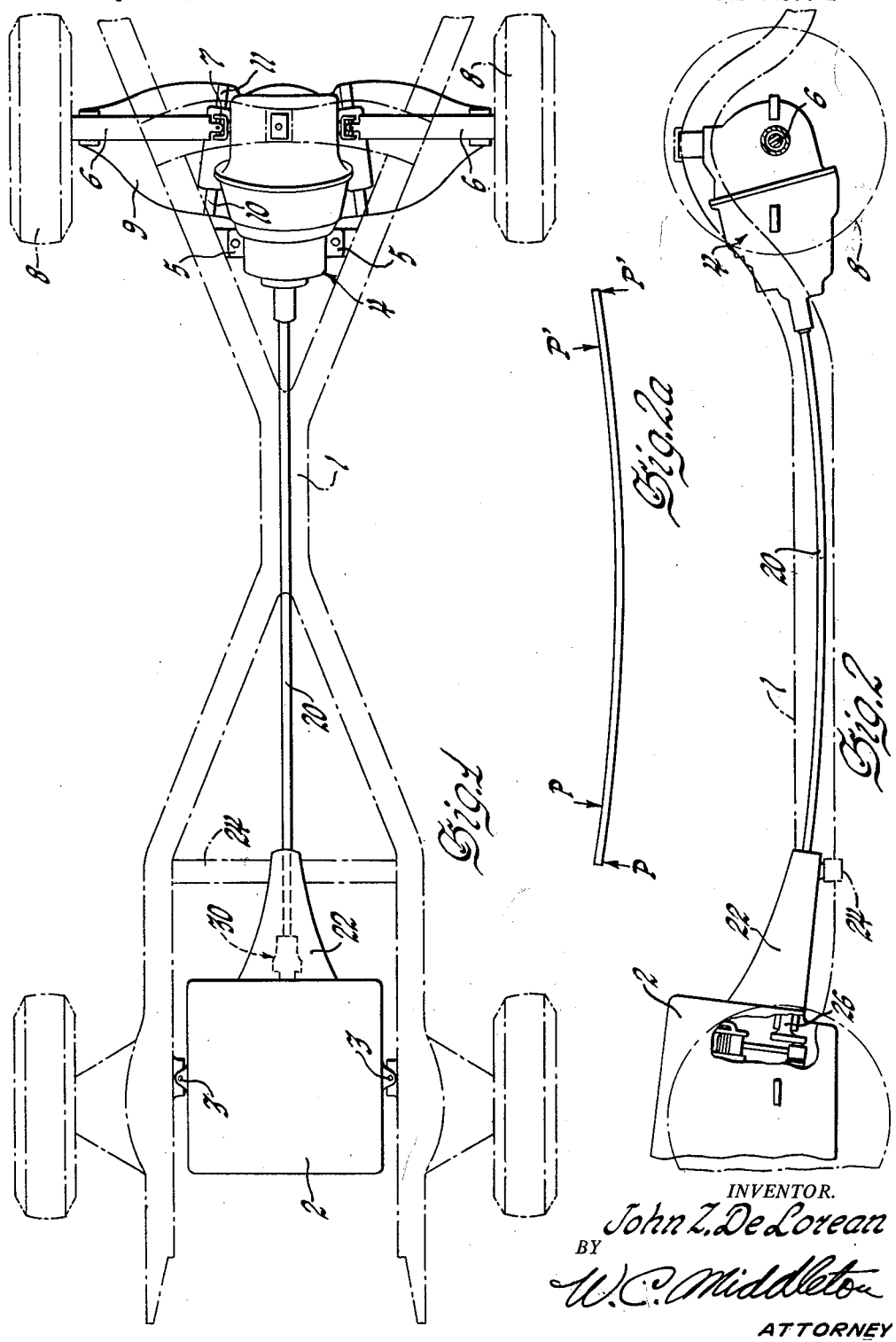

INVENTOR.
John Z. DeLorean
BY
W. C. Middleton
ATTORNEY

Nov. 3, 1964 J. Z. DE LOREAN 3,155,187
POWER SHAFT
Filed Sept. 19, 1960 7 Sheets-Sheet 3

INVENTOR.
John Z. DeLorean
BY
W. C. Middleton
ATTORNEY

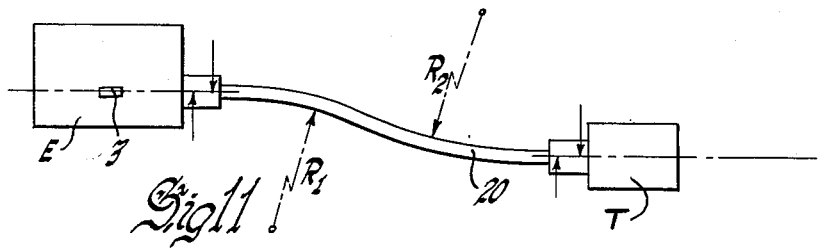
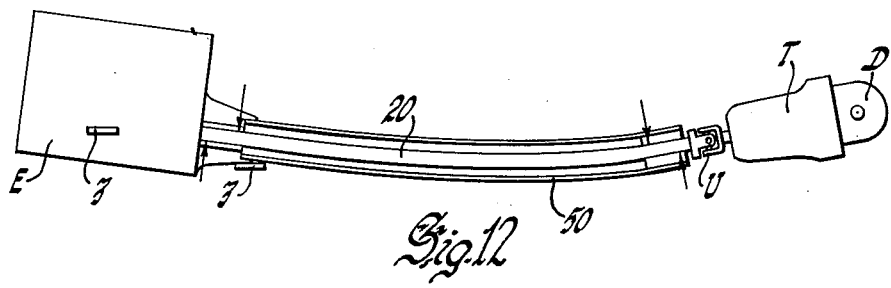
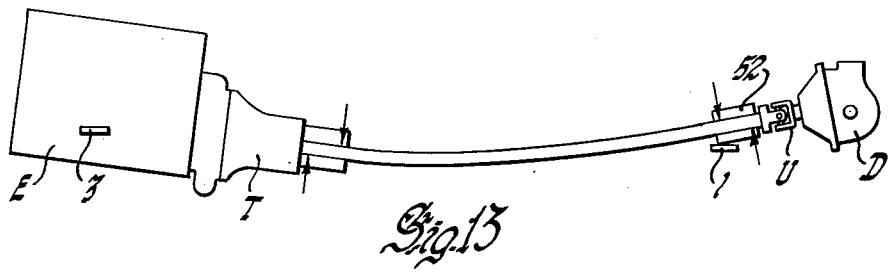
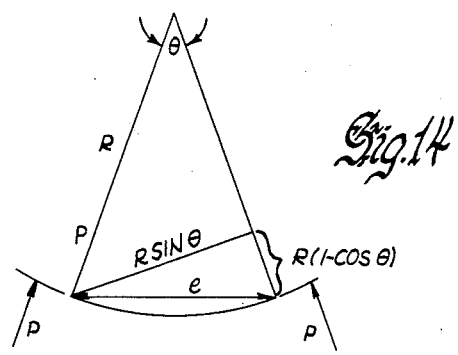
INVENTOR.
John Z. DeLorean
BY
W.C. Middleton
ATTORNEY Nov. 3, 1964  J. Z. DE LOREAN  3,155,187
POWER SHAFT
Filed Sept. 19, 1960  7 Sheets-Sheet 5

RATIO OF EXCITING FREQUENCY TO RESONANT FREQUENCY

INVENTOR.
John Z. DeLorean
BY
W. C. Middleton
ATTORNEY

INVENTOR.
John Z. DeLorean
BY
W.C. Middleton
ATTORNEY

INVENTOR.
John Z. DeLorean
BY
W. C. Middleton
ATTORNEY

United States Patent Office 3,155,187
Patented Nov. 3, 1964

3,155,187
POWER SHAFT
John Z. De Lorean, Birmingham, Mich., assignor to General Motors Corporation, Detroit, Mich., a corporation of Delaware
Filed Sept. 19, 1960, Ser. No. 57,065
18 Claims. (Cl. 180—70)

This application is a continuation-in-part of S.N. 676,094, Power Shaft, filed August 5, 1957, and since abandoned.

This invention relates to power transmitting device and more particularly to drive shafts for transmitting rotational motion from a prime mover to a rotating load. The invention is applicable especially to motor vehicle propeller shafts.

The transmission of power from an engine or other prime mover to a load involves designing the drive components for carrying a predetermined maximum torque and operating at a predetermined maximum speed using as simple a drive train as is consistent with safe stresses introduced in the parts of the drive train. There are a number of instances where the rotating power transmission must, in effect turn a corner, that is, where due to space limitations, alignment of elements, or due to one or another of the components being mounted for movement relative to the other, the drive train cannot extend in a straight line from the initial driving member to the final driven element. The problem of turning corners arises particularly in motor vehicles wherein the power plant is usually located near the front of the vehicle and the drive wheels at the rear. The drive connection between the power plant and rear end must of necessity lie at a low level especially when it passes under the passenger compartment. This level in contemporary cars is considerably lower than the crankshaft of the engine and the pinion shaft of the rear axle differential. In the past, the usual installation, where the power turns a corner, requires one or more universal joints for bending the power path under the passenger compartment. These universal joints are expensive, require maintenance and add vibration problems to the vehicle because they do not rotate at constant velocities. A further problem arises due to the fact that motor vehicles require a wheel suspension that will allow the wheels to move up and down relative to the vehicle and hence relative to the power plant or engine. The usual construction involves a rear axle differential that is suspended from the vehicle proper and is connected to the propeller shaft by means of a universal joint.

The propeller shafts used in motor vehicles generally are designed for stiffness, i.e., minimum deflection both torsional and bending, as well as critical speed. The conventional shaft as used in present motor vehicles is therefore generally a large diameter hollow shaft having and angular deflection under maximum load of less than one degree per foot of length and bending deflection less than .01 in. per foot of length. To present whipping or whirl the conventional shaft is designed to have a high critical speed, that is, a shaft having a high natural frequency in bending. This results in a large diameter stiff shaft design with a torsional shear or torque carrying strength much greater than is necessary.

It is therefore an object of this invention to provide a simple power transmission shaft between a power plant and a load wherein axes of revolution of the power plant and load can be at angles to each other without the use of universal joints or flexible couplings.

It is a further object of the invention to provide a power transmission shaft between a power plant and a load wherein the stiffness of the shaft is considerably less than the conventional shaft and yet there is no whirl or whip during rotation at high speeds.

It is still a further object of the invention to provide a propeller shaft in a motor vehicle between an inclined engine and an inclined rear axle wherein the shaft is curved below the passenger compartment of the vehicle.

The present invention briefly comprises applying bending moments to a power transmission shaft wherein the shaft has a predetermined bending stress when at rest. This results in a shaft having novel strength and operational characteristics.

Figure 4:
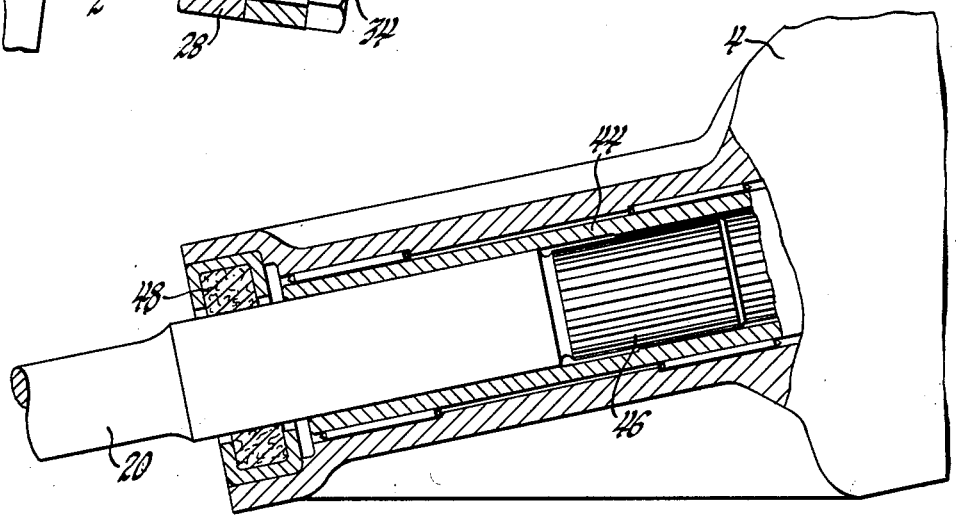
Figure 5:
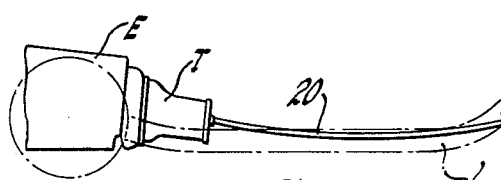
Figure 6:
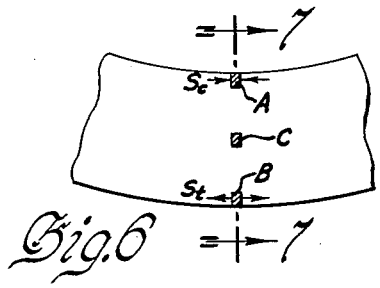
Figure 7:
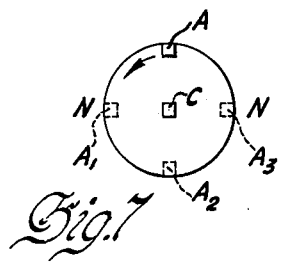
Figure 8:
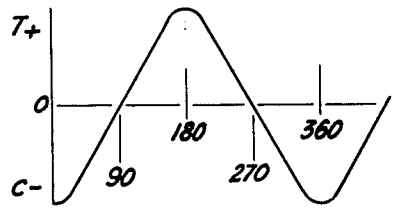
Figure 9:
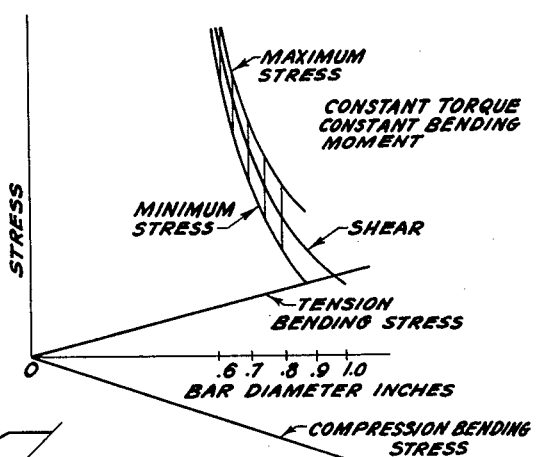
Figure 10:
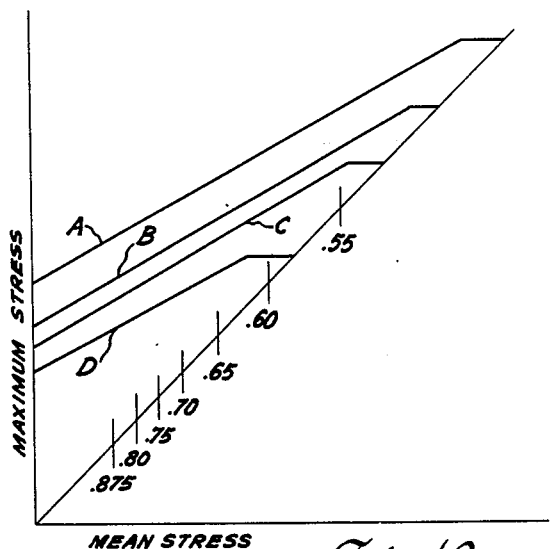
Figure 15:
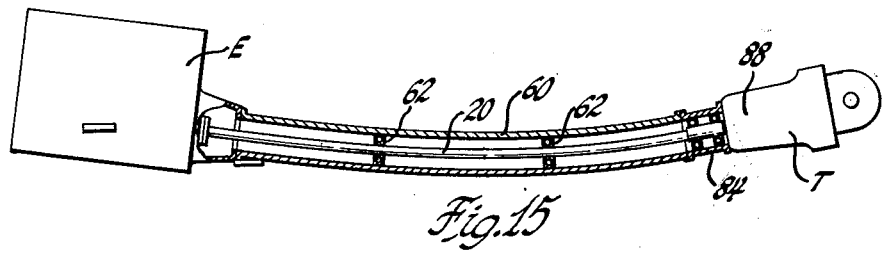
Figure 16:
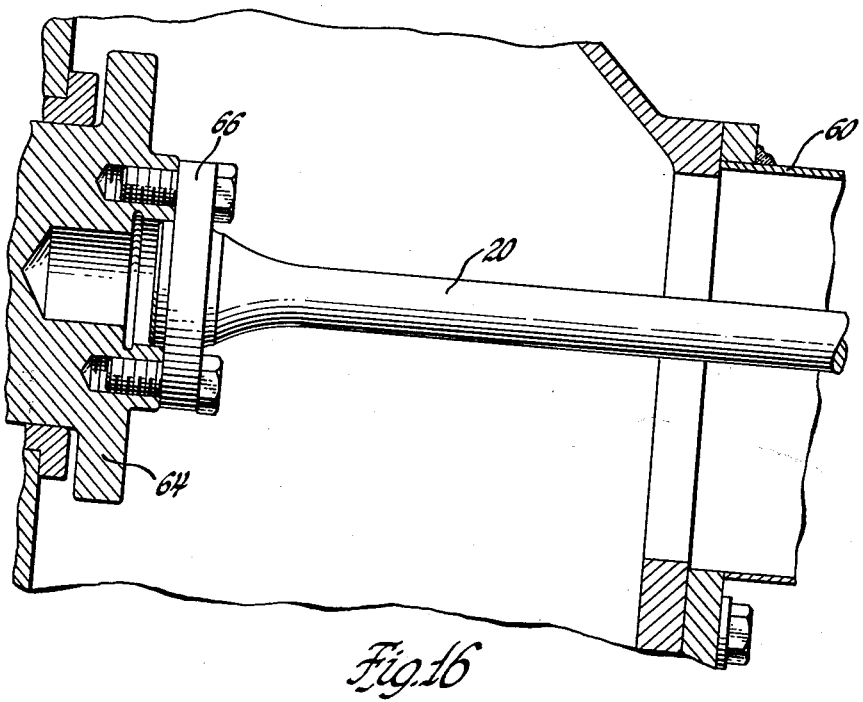
Figure 19:
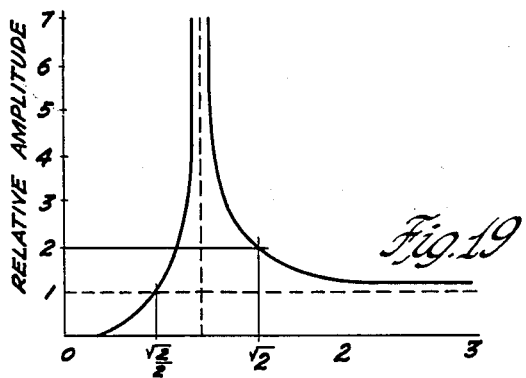
Figure 20:
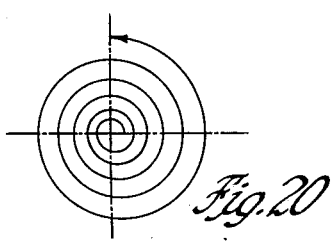
Figure 17:
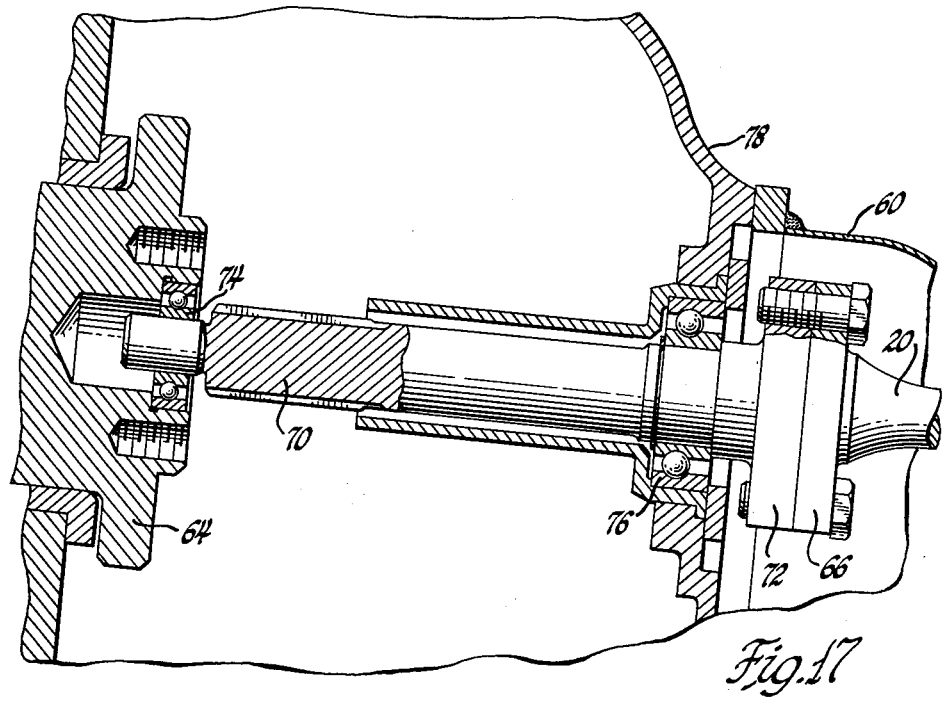
Figure 18:
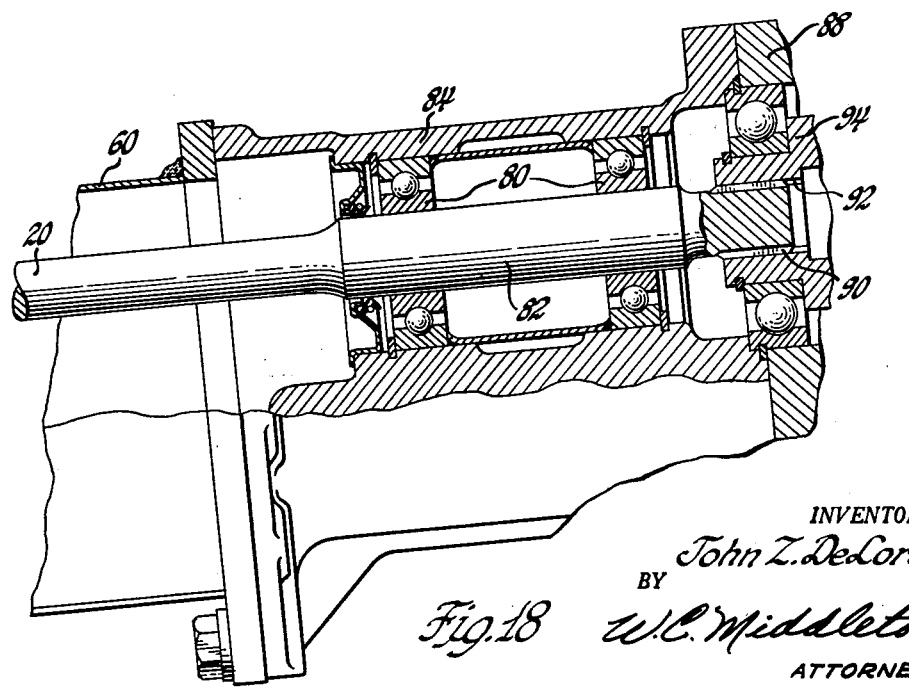
Figure 21:
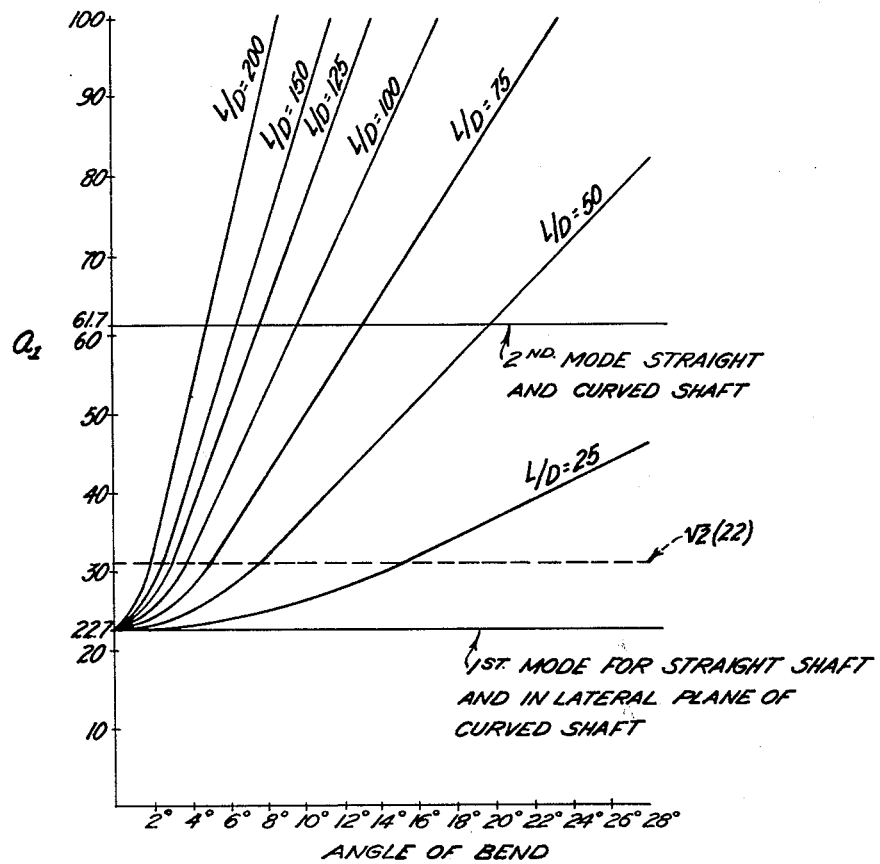
Figure 22A:
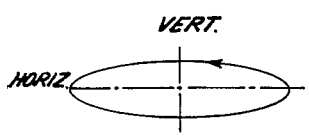
Figure 22B:
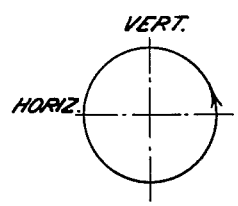
Figure 22C:
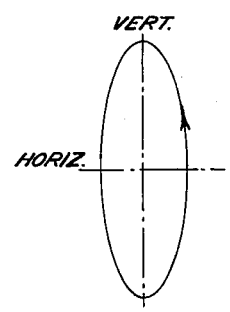

Referring now to the figures which show several preferred embodiments of the invention and in which:

FIGURE 1 is a top view of a motor vehicle chassis with a rear mounted transmission and incorporating the invention, FIGURE 2 is a side view of the chassis of FIGURE 1, FIGURE 2a is a diagrammatic view showing the bending forces on the shaft, FIGURE 3 is a sectional view of the shaft support at the engine end of the shaft, FIGURE 4 is a sectional view of the shaft support at the transmission end of the shaft, FIGURE 5 is an alternative arrangement wherein the transmission is located between the engine and the drive shaft, FIGURE 6 is a diagram showing forces acting on a particle of material at the circumference of the shaft, FIGURE 7 is a sectional view taken on the line 7—7 of FIGURE 6, FIGURE 8 is a diagram showing the change in stress in a particle in the shaft, FIGURE 9 is a diagram showing the relationship between shaft diameter and the variable stresses, FIGURE 10 is a diagram showing the relationship between maximum allowable stress and allowable means stress for different materials as well as computed stresses for different diameter shafts, FIGURE 11 is an alternative arrangement with a compound curved shaft, FIGURE 12 is another arrangement, FIGURE 13 is still another arrangement, FIGURE 14 is a diagram showing the relationship between the length, radius of curvature and angle of the shaft, FIGURE 15 is an alternative arrangement utilizing a torque tube, FIGURE 16 is an enlarged view similar to FIGURE 3 showing an alternative shaft connection, FIGURE 17 is still another alternative shaft connection wherein a clutch is used, FIGURE 18 is an enlarged view similar to FIGURE 4 showing an alternative shaft support, FIGURE 19 is a resonance curve of a shaft system, FIGURE 20 shows the motion about the normal axis of rotation of a conventional vibrating shaft, FIGURE 21 shows the relative change in resonant frequency of various systems utilizing the invention, FIGURE 22a illustrates the motion of a system incorporating the invention operating at or near its lower resonant frequency $F_{N_1}$, FIGURE 22b shows the motion of the shaft operating between $F_{N_1}$ and $F_{N_2}$, and FIGURE 22c shows the motion of the shaft at or near the upper resonant frequency $F_{N_2}$.

Referring now to FIGURE 1 which shows one application of the invention, 1 represents a vehicle frame which may be formed of several pieces fastened together by any suitable means, and on which is mounted an engine 2 supported at points 3, and a combination transmission and differential unit 4 mounted on the frame at points 5. A pair of rear axles 6 are pivotally connected at 7 to the differential 4 and carry the rear drive wheels 8. The rear axles and wheels are pivotally suspended by a control arm 9 that is pivoted at points 10 and 11, on the transmission-differential 4. The pivots 7, 10, and 11 allow the wheels 8 and axle 6 to move up and down relative to the transmission-differential 4 and the frame 1.

Joining the engine and the transmission is the drive shaft 20. The shaft 20, which forms an important part of the invention is a solid one piece shaft having a relatively small diameter. The shaft is normally straight, but is held curved as shown in FIGURE 2 when installed in the vehicle. Fastened to the rear of the engine 2 is a housing 22 that is supported by a cross beam 24 of the vehicle frame 1 and forms one of the engine mounting points. As shown in FIGURE 3, the engine crankshaft 26 has formed on one end thereof a flanged portion 28 forming one-half of a shaft coupling 30, the other half 32 of the coupling being secured by bolts 34 to the crankshaft half 28. The drive shaft 20 is connected by splines 36 to the interior of the coupling 30 and is prevented from axial movement by the tapered surface 38 and the nut 40 fastened on the threaded portion 42 of the drive shaft 20.

The other end of the drive shaft 20 extends into a sleeve shaft 44 and held against relative rotation by splines 46 but can slide axially along the splines. The sleeve shaft 44 is journalled in and extends into the transmission housing 4 wherein it functions as a transmission input shaft. The details of the transmission which form no part of the invention are not shown and the transmission may be of any suitable type. A fluid seal 48 prevents transmission oil from leaking out the end of the transmission.

The transmission output shaft, not shown, is connected to the pinion shaft of a differential gearing which in turn is connected through the universal joint couplings 7 to the rear axles 6. As stated above, the drive shaft 20 in its normal condition before assembly is straight and unstressed. The shaft is curved during assembly with coupling 30 and sleeve shaft 44 acting to place a bending moment on each end of the drive shaft to hold it in the shape shown. FIGURE 2a shows the forces P and P′ that form a couple on each end of the shaft to hold it in the curved prestressed or preloaded condition. As will be explained below it is preferred that the couples P—P and P′—P′ are substantially in the same in the same plane which in the case of FIGURE 2a would be the plane of the paper. Furthermore, as will be explained below it is preferable that the coupling 30 and shaft 44 have their axes forming lines tangent to a common circle in the same plane, again, in the case of FIGURE 2a the plane of the paper in which case the bending moments at each end of the shaft will be equal.

Referring to FIGURE 6, which shows a portion of the curved shaft at rest, it will be seen that an elementary area A at the top of the shaft will have compression stresses Sc acting on it, while an elementary area B at the bottom of the shaft will have tension stresses St acting on it. An elementary area C in the center of the shaft, or neutral plane of the shaft, will have neither compressional or tensional stresses. As the shaft rotates counterclockwise as seen in FIG. 7 the area A likewise moves counterclockwise and the compressional stresses are reduced to zero when the particle A is in position $A_1$ or in the neutral axis N—N of the shaft. As the area A further rotates towards position $A_2$ the tensional stress begins and at $A_2$ a maximum tensional stress equal to the compressional stress at position A exists. As the particle A further rotates it moves again into the neutral axis N—N zone where at position $A_3$ the stress is zero and further movement to original position A returns the maximum compressional stress to particle A. Thus, it will be seen from the above that the bending stresses on particle A which is representative of all particles in the shaft, except those at the center, will fluctuate from a maximum compression stress to zero to a maximum tension stress to zero and again to a maximum compression stress with each revolution of the shaft. This change in stress is shown in FIG. 8 on which compression stresses are negative and tension stresses are positive.

The maximum tension and compression stresses in shaft 20 can be predetermined by the bending moments applied by couples P—P and P′—P′. The stresses introduced by the end moment can be computed by calculating the angle subtended by the arc formed by the curved shaft. FIG. 14 shows the relationship between the radius of curvature, of the circle of which the shaft forms an arc, to the angle subtended by the arc. By using the equation $$M=\frac{\theta E I}{L}$$

where $\theta$ = the angle in radians subtended by the arc of the shaft, E equals the modulus of elasticity of the shaft material, I equals the moment of inertia of the shaft cross section, and L equals the length of the shaft, the bending moment can be calculated. Note that this equation will hold true only for the case of a shaft curved in a true circular arc. If the bending moments at the end of the shaft are not equal, as when the moments are not applied on a portion of the shaft tangent to a common circle, then the moment and maximum stress can be determined by known beam analysis. By using the equation $$S=\frac{Mc}{I}$$

where c is the radius of the shaft, M the bending moment and I the moment of inertia, the maximum stresses due to the bending moment can be calculated.

If the shaft 20 is transmitting torque from the power source to the load, the maximum shear stress in the round shaft can be calculated by the equation $$\mathrm{Max}_s=\frac{2T}{\pi R^3}$$

where T equals the torque transmitted and R equals the radius of the shaft. For example, if the angle $\theta$ were 7°, the length of the shaft 72 inches, the modulus of elasticity 30,000,000 p.s.i., the shaft radius ⅜ inch and if the shaft 20 is round, it can be calculated by the given equations that the bending moment at each end of the shaft would be 1471 pound inches, the maximum bending stress 19,081 p.s.i., and if a torque of 350 foot pounds were being transmitted by the shaft a maximum shear stress of 50,707 p.s.i. would occur.

The maximum shear stress S is constant with constant maximum torque transmission and hence does not change as the shaft rotates. However, as explained above, the bending stresses vary from a maximum positive (tension) to a maximum negative (compression). The principal or combined stresses while not arithmetically additive because the maximum stress occurs at an angle relative to the bending tension and compression stress, can be calculated mathematically or graphically by known methods. Such a combination of the maxium shear stress and the variable bending stress for the example used will give a maximum stress of 61,000 p.s.i. and a minimum of 42,000 p.s.i. This represents a mean or average stress of 51,500 p.s.i.

FIG. 9 shows the maximum and minimum principal or combined stresses, the shear stress and bending stress for various diameter shafts assuming a constant bending moment and constant torque load. It will be seen from FIG. 9, that as the shaft diameter is increased the shear stress as well as the maximum and minimum combined stresses becomes smaller. However, the difference between the maximum and minimum stresses or the change in stress as the shaft rotates one-half revolution, becomes greater. In designing a shaft subject to repeated changes in stress the variation in stress becomes just as important in the design as is the maximum stress. This is due to the fact that the endurance or fatigue strength of the shaft is lowered as the shaft stresses variation is increased during operation.

FIG. 10 shows a modified Goodman diagram on which are plotted the maximum working stresses against the mean or average working stresses of different size shafts using the 7° bend, 72″ length and 340 ft. lb. torque installation of the example used above. Also plotted are the endurance limits of various types of steel labeled A, B, C and D. These limits have been determined experimentally and are well known. They represent safe stresses that can be tolerated for an unlimited number of cycles of change from maximum to minimum stress. It will be seen that the ¾″ diameter shaft used in the illustration has its maximum stress considerably below the limit of the steel materials shown. In general the harder the material, as measured by standard Rockwell or Brinnell tests, the greater the endurance limit. It will also be seen from that the smaller the shaft, the closer the working stresses approach the safe values.

In the above example it has been assumed that the bending moments applied to the shaft are arranged to be in a line tangent to a common circle in a common plane. This arrangement produces a uniform maximum bending stress throughout the length of the shaft. The result is that a uniform diameter shaft can be designed for safe working stresses with the maximum utilization of material. If the bending moments P—P and P′—P′ applied by the end bearings are aligned in the same plane they will not be equal. For example, if the axis of rotation of the engine and the axis of the transmission were not in the same plane there would be greater bending stresses at some points along the shaft than at others. If the line of action of the bending moments were not normal to lines tangent to a common circle even if they were in a common plane then again bending stresses would vary throughout the length of the shaft. In the application to a vehicle the curve of the shaft might be in a plane at some angle relative to the vertical or horizontal plane of the vehicle. In other words, the shaft when viewed from the top would appear curved as well as when viewed from the side.

The actual maximum bending stresses and the resulting maximum and minimum combined or principal stresses in a shaft curved in other than a circular arc can be calculated by known means and as long as the result when plotted on the graph illustrated in FIG. 10 is below the safe working stresses of the particular shaft material used the shaft will function safely for an unlimited period of time. The advantage of designing the installation so that the shaft takes the shape of an arc of a circle with the bending moments applied on a line tangent to that circle is that there is maximum utilization of the material in the shaft.

One of the primary advantages of the invention results from the unexpected fact that the stressed curved shaft does not exhibit the normal critical or resonant speed characteristics of a conventional shaft. Thus the so-called "critical speed" of a shaft is its first mode bending resonant frequency. Usually power transmission shafts are designed either to operate below this frequency, above this frequency or special supports or center bearings are provided to limit shaft whip or vibration at this frequency. Where a shaft is rotated at its first mode resonant frequency for very long, it will usually fail unless restrained or damped. The vibration forces present when a straight shaft is operated at this "critical" speed are very high and even if restraining means such as steady-rest bearings are provided, the vibration forces transmitted through the bearings to the vehicle are large and objectionable.

The "critical" or first mode resonant frequency of a straight shaft in cycles per second (c.p.s.) can be determined by the equation $$W_n = a_n \sqrt{\frac{EI}{u_1 l^4}}$$

wherein EI is the bending stiffness of a section of the shaft, $l$ is the length of the shaft, $u_1$ is the mass per unit length $=W/gl$, and $a_n$ is a numerical constant described in more detail below and which depends on how the shaft is arranged and supported.

A shaft may be supported at one end (cantilever) or at both ends. The end supports or bearings supporting or holding the shaft may be free to pivot themselves or allow the shaft to pivot, in which case the shaft is said to be simply supported. Where the shaft is supported by pivotal bearings at each end, it is said to be hinged-hinged.

If the shaft support or bearing is not free to pivot itself and holds the shaft so that the axis of rotation is fixed, the shaft is said to be clamped and a shaft supported in this manner at both ends is said to be a "clamped-clamped" shaft. This is the normal power transmission shaft arrangement. According to the authorities such as Den Hartog in "Mechanical Vibrations" 4th edition on page 432, the constant "$a$" for the first mode frequency of a clamped-clamped shaft with non-pivoting bearings the first mode constant $a_1=22$. The second mode constant $a_2=61.7$ and the third $a_3=121.0$.

For a round steel shaft, the equation for $W_n$ reduces to $$W_n = 8030 \frac{aD}{L^2}$$

where $a$ is the coefficient, D is the shaft diameter and L is the shaft length in the same dimensions as the shaft diameter. Thus the normal straight shaft with non-pivoting bearings or supports and where $a_1=22$, the first mode or "critical" speed $$N_c = 176,660 \frac{D}{L^2}$$

A ¾ inch diameter shaft 72 inches long would then have a critical speed $$N_c = \frac{176,660 \times .75}{72 \times 72} = 25.6 \text{ c.p.s.}$$

This is equivalent to shaft rotation of 1536 r.p.m. and clearly would be in the normal range of operation of a motor vehicle drive train.

FIGURE 19 illustrates the maximum displacement of a system such as a shaft with a constant harmonic force applied to the shaft at different frequencies. At resonance $F_N$ the motion will become infinite and a shaft operated for very long at this frequency would probably fail after whipping.

FIGURE 20 illustrates the path of a normal shaft as its deviation from its original axis of rotation increases with each revolution. The amplitude of vibration will increase with each revolution until the maximum displacement for the frequency of operation shown in FIGURE 19 is attained. Operation at resonance $F_N$ will cause the amplitude or gyration of the shaft about its axis of rotation to build up until failure. The relative vibration force of a rotating mass will vary directly as the unbalance mass, directly as the radius or displacement of the mass from the axis of rotation and as the square of the frequency as speed. In the case of a rotating shaft with a fairly uniform mass, r consists mainly of the displacement of the mass center from the original axis of rotation, which displacement increases with each revolution as seen in FIGURE 20. Thus the vibratory force builds up rapidly when the shaft operates at or near its resonant frequency since the radius increases rapidly. This increasing force bends the shaft further with each revolution until it fails or until the force is absorbed or damped. For example, if a shaft having a natural frequency of 20 c.p.s. is operated at $\sqrt{2}(20)$ or 28 c.p.s., the amplitude of vibration will be less than twice that at any higher speed. Similarly, if the shaft is operated at a speed less than $½\sqrt{2}F_N$ the amplitude will be less than at any higher speed. It should be noted that as the shaft rotation or operating frequency increases above the resonant frequency, the amplitude rapidly drops at $F_N\sqrt{2}$ or $1.41F_N$ the maximum amplitude is only twice the amplitude that exists at very high speeds.

It can be shown mathematically that there is no real first mode critical speed of a prestressed or preloaded curved shaft. When the shaft is held in a curved stressed condition its stiffness no longer is equivalent to a straight beam but more resembles that of a curved beam or an arch which is stiffer in the plane of the arch than a plane normal the arch. This increased stiffness of the shaft due to the arch effect, results in different resonant frequencies much higher than for a straight shaft acting as a circular beam, i.e., having the same stiffness in all planes. This greater stiffness, in even one plane, has the effect of allowing the shaft to resist unbalanced centrifugal forces that would cause a straight unloaded shaft to whip or bend. As the shaft rotates whenever any unbalanced force tending to cause the shaft to whip or move out of its axis of rotation acts in the maximum tension and compression plane, i.e., in the plane of the curve of the shaft, the stiffness of the shaft or resistance to moving away from its normal axis of rotation is considerably greater. If the preload or curvature of the shaft is sufficient to give the shaft a high degree of stiffness in at least one plane then the unbalanced force will be overcome and the shaft will return to its normal axis of rotation. Thus, as the shaft rotates through one-half of a revolution, any unbalanced force due to the center of gravity of the shaft not being at the axis of rotation will be balanced by the increased stiffness of the shaft when the force passes through the plane of maximum bending stress. Therefore it is obvious that the effective overall stiffness, during rotation, of the curved preloaded shaft is that of its maximum stiffness or that in the plane of the shafts curve. As explained above this stiffness is considerably greater due to the arch effect and hence the shaft does not have the usual properties of a straight shaft with regard to critical speed and stiffness or resistance to deflection but is much superior to a straight shaft.

Where the shaft is curved according to the invention, there is no longer a single resonant frequency but there are two distinct resonant frequencies. One of these frequencies $F_{N_1}$, namely that in the plane perpendicular to the plane in which the shaft is curved, remains constant. In the plane of the curve the natural frequency $F_{N_2}$ increases as the shaft is bent or curved more and more. Thus as the curvature is increased the frequency spread between the two frequencies increases. What has happened is that the coefficient $a_n$ for conventional shafts in the equation $$W_n = \frac{EI}{u_1 l^4}$$

can no longer be used. Thus the $a_1=22$ value normally used, applies only to a straight shaft or in the case of a curved shaft, only in the plane perpendicular to the plane of curvature.

The change in the value of $a_1$ can be calculated by the equation:

$$a_1 = \sqrt{\frac{32}{3}\left(\frac{L\alpha}{D}\right)^2 + \frac{1}{3}(4\pi^2-\alpha^2)^2}$$

where:

L is the shaft length,
$\alpha$ is the angle of curvature, in radians, corresponding to angle $\theta$ of FIGURE 14, and
D is the shaft diameter.

The value of $a_1$ for shafts having different $L/D$ ratios is shown in the graph of FIGURE 21. It can be seen that as the shaft is bent more and more, the value of $a_1$ increases and becomes higher than even that of the second mode frequency or the value of $a_2$. It should be noted that curving the shaft has little or no effect on the second mode frequency, and hence it is possible to have the apparently impossible condition wherein the first mode resonant frequency is higher than the second mode frequency. Where the shaft is curved as in the invention the shaft does not move in the spiral path of FIGURE 20 but assumes an elliptical motion as shown in FIGURES 22a. In FIGURES 22a, 22b and 22c, the vertical axis is assumed to be the plane of the curvature of the shaft while the horizontal axis is the plane lateral to or perpendicular to the curvature plane. If the shaft rotates at the straight shaft natural frequency $F_N$, i.e., where $a_1=22$ this resonance applies only to the horizontal plane. As the shaft rotates 90° the amplitude will be reduced to the maximum amplitude of a different system having a different resonant frequency $F_{N_2}$ depending on the value of $a_1$ as found from equation given above or the graph on FIGURE 21. Since the maximum displacement of the system having a resonant frequency $F_{N_2}$ is less than that of the displacement of a system operating at resonant frequency, then the amplitude of vibration will be decreased during this 90° rotation instead of continuing to increase as in the case of a straight shaft whose motion is seen in FIGURE 20. Thus, the deflection during a complete revolution of the shaft when operating near $F_{N_1}$ will be a maximum when the inherent unbalance in the shaft is in the horizontal plane and at a minimum when the inherent unbalance is in the vertical plane or plane of curvature.

If the shaft is operated at a higher speed resulting in a higher exciting force frequency, the horizontal plane amplitude will decrease and the vertical plane amplitude will increase. At some frequency between $F_{N_1}$ and $F_{N_2}$ the motion will be circular. This is shown in FIGURE 22b. A continued increase in speed toward $F_{N_2}$ will cause the vertical deflection to become still larger and the horizontal deflection to become smaller until at $F_{N_2}$ the motion will be as shown in FIGURE 22c. It should be noted that in actual practical the actual displacement is very small since the maximum displacement corresponds to the first 90° of revolution of a straight shaft which motion is shown in FIGURE 20.

If the ratio between $F_{N_1}$ and $F_{N_2}$ is increased sufficiently by bending the shaft so as to raise $F_{N_2}$, the maximum displacement will be reduced to a very low level. Referring to FIG. 19 it will be seen that as $F_{N_1}$ and $F_{N_2}$ are sufficiently spread, the maximum displacement in one plane will occur when there is a very low displacement in the other plane. Thus it is advisable to separate the two frequencies as much as possible, or in other words, to bend the shaft more. Since bending the shaft introduces increased bending stresses there is a limit to which the shaft can be bent and operate safely. Also FIG. 21 indicates that a high $L/D$ ratio shaft will provide a greater frequency separation. This $L/D$ ratio is limited by the physical dimensions of the shaft application such as the vehicle dimensions and the minimum shaft diameter is limited by the maximum torque that must be transmitted.

It has been found that adequate separation of frequencies can be obtained for satisfactory results if the ratio between the frequencies is greater than $\sqrt{2}$ or 1.414. In other words $a_1$ should be greater than $\sqrt{2}(22)$ or about 31. This is indicated on FIGURE 21 by the dashed horizontal line.

With a $L/D$ ratio of 200, $a_1$ will be greater than 31 if the bend angle is approximately 2 degrees or more. If the $L/D$ ratio is as low as 25, it requires a bend angle of about 14½ degrees to raise the value of $F_{N_2}$ to $\sqrt{2}F_{N_1}$. The physical requirements of curving the shaft under or around a member such as the passenger compartment of a vehicle will dictate the limits of the angle, the length and the diameter.

Thus from equation for $a_1$ or from FIGURE 21, the bend angle required to give satisfactory performance can easily be found for any $L/D$ ratio. If a shaft 75 inches long is used and the torque to be transmitted requires a diameter of at least ½ inch then the maximum $L/D$ ratio will be 75/½=150. This ratio will provide sufficient frequency separation if the bend angle is about 2½ degrees. If the bending stresses as determined by the equations given previously, or by the type of graphs shown in FIGURES 9 and 10, are not exceeded, the angle of bend may be increased until these bending stresses are equal to the safe value the material can handle.

In the example given previously where a 72 inch, ¾ inch diameter shaft or a $L/D$ ratio of 96 width and a 7° bend angle, $a_1$ for the vertical plane from the equation or the graph of FIGURE 21 is seen to be approximately 45. $F_{N_2}$ then is $$8030a\frac{D}{L^2} = 8030 \times \frac{45 \times .75}{72 \times 72} = 52 \text{ c.p.s.}$$

The straight shaft or horizontal plane frequency is $$\frac{8030 \times 22 \times .75}{72 \times 72} = 25.5 \text{ c.p.s.}$$

Thus the resonant frequency in the vertical plane is twice that in the horizontal plane.

In actual practice a vehicle having a shaft with 72 inches length, ¾ inch diameter and a bend angle of 7° will not have any rotatable vibration at normal speeds including the 25.5 c.p.s. or 1530 r.p.m. Bending the shaft more will even reduce any vibration still further.

The above noted properties of the preloaded curved shaft, i.e., increase in the critical speed or natural frequency of a loaded shaft over an unloaded shaft, are highly important as it allows the designer to design the shaft for maximum torsional shear resulting in a small diameter shaft rather than design for stiffness resulting in a large diameter shaft with much greater torque carrying capacity than is necessary.

The invention can be applied to applications wherein one end of the shaft moves relative to the other end. In this case the bending stresses will vary considerably more and therefore the particular shaft will fall higher up on the diagram of FIG. 10. However, as long as the calculated maximum and minimum stresses compared to the maximum stress falls below the endurance limit of the material used in the design is proper. Examples of material suitable for use are such spring steels as SAE 5160 and SAE 9262 although any number of materials may be used. In all cases a safety factor would be used. For example, the maximum stress of illustrative ¾ inch shaft described above falls about only half way up the scale of material A and if this material were used there would be a safety factor of at least 2. It should be noted that the safety factor cannot be determined directly from the position of the design shaft on FIG. 10, however, it can be determined mathematically.

FIG. 11 shows another example of how the invention can be applied in a power transmission arrangement. In this case the axis of the engine E is located in the same longitudinal vertical plane as the axis of transmission T and is parallel thereto. However, instead of having the bending moment applied on lines tangent to a common circle the bending moments are applied to lines tangent to two circles having a radius of curvature $R_1$ and $R_2$. By proper alignment of the bending moment application points the radii of the two circles can be made the same. In this case because of the double curvature the radius of curvature will be considerably smaller than in the case of the shaft of FIGS. 1–4. A smaller radius of curvature requires greater bending moments and resulting greater bending stresses. These stresses can be calculated for each application and if the resulting maximum stress vs. mean stress plotted on the Goodman chart of FIG. 10 is within the safe limits then any number of curves can be utilized in a shaft incorporating the invention.

FIG. 5 shows an application to a motor vehicle wherein the transmission T is located ahead of the differential D and the drive shaft is fastened directly to the differential. It will be noted that in an installation of this type the torque and resulting torsional shear stress will be greater than in the preferred embodiment of FIGS. 1–4. In the vehicle of FIG. 5 the engine torque is multiplied by the maximum torque multiplication of the transmission. If the engine torque is small enough so that even if multiplied by the transmission, the resulting shear stress in the shaft produces a low enough combined stress, then this drive arrangement can be used.

FIG. 12 illustrates another application of the invention wherein the bending moments are applied to the shaft from a rigid stationary housing 50, fixed to the engine, that surrounds the shaft 20 connecting an engine E and a transmission T. In the example a universal joint U is provided between the shaft and the transmission. The transmission could rotate or move relative to the end of the shaft 20 with the shaft remaining in its prestressed curve determined by the relatively fixed bending moment forces.

FIG. 13 shows still another embodiment wherein the transmission T is head of the shaft and the shaft is connected by means of a universal U to the differential D. The engine E and shaft support 52 are both fixed to the frame 1 which fixes the bending moments on the shaft.

FIG. 15 illustrates another vehicle application of the invention. In this form a curved torque tube 60 solidly connects the engine E with the rear transmission T. The tube 60 surrounds the curved shaft 20 and protects the same against mechanical abuse and corrosion. At the same time the tube prevents any relative movement between the engine and transmission. Bearings 62 form no part of the invention and are fully described as to form and use in Patent No. 3,037,573, entitled Shaft Vibration Dampening, in the name of Hugh W. Larsen, filed September 26, 1958 and assigned to the assignee of the present invention. These bearings 62 are not essential, however, where the second mode frequency is relatively low, as where a large length to diameter ratio shaft is used and where the shaft is operated at high speeds equivalent to such frequencies, the bearings 62 will provide a more desirable operation as set forth in the Larsen application.

FIG. 16 shows a form of shaft connection to the engine crankshaft 64. The shaft 20 has a flange 66 formed integral therewith which is bolted directly to the engine shaft 64. This arrangement is an alternative to the arrangement of FIG. 3 wherein an intermediate flange member 30 is splined on the shaft 20 and which is bolted to the engine shaft 28.

FIG. 17 illustrates another method of connecting the shaft to the engine. This arrangement which allows the use of a drive clutch between the engine and shaft, utilizes an intermediate shaft member 70 which has a flange 72 bolted to the flange 66 on shaft 20. The shaft 70 is supported by bearing 74 in the engine shaft 64 and by bearing 76 in a stationary housing member 78. Any suitable conventional friction disc clutch, not shown, would be inserted between the engine shaft 64 and the intermediate shaft 70. This arrangement would be particularly useful where the transmission employed at the rear of the vehicle is of the sliding gear type without a fluid torque transmitting member.

In the FIG. 16 arrangement the bending moment holding the shaft 20 in its curved position is transferred through the flange 66 to the engine shaft 64 and the engine bearings, not shown. In the FIG. 17 arrangement the front bending moment is transmitted through flanges 66 and 77 to the shaft 70 and to the bearings 74 and 76.

FIG. 18 illustrates another suitable shaft connection as might be used to connect the shaft 20 to the input shaft of a transmission. The arrangement is similar to that of FIG. 4, however, here a pair of axially spaced bearings 80 surround an enlarged diameter portion 82 of the shaft 20 and transmit the rear bending moment between the housing 84 and the shaft 20. The torque tube 60, shown in FIG. 15, is shown in FIG. 18 as directly connected to the housing 84 which is in turn connected to the transmission housing 88. The rear end of shaft 20 has external splines 90 formed thereon which engage internal splines 92 found in the transmission input shaft 94.

It will be seen from the above that the invention has many applications. The provision of a shaft capable of transmitting a large torque at high speeds around an obstacle without the use of universal joints is believed to provide many advantages over conventional power transmission systems.

The invention may be utilized on other vehicle applications such as front wheel drives with rear mounted engines, etc. Also the invention may be readily applied in the marine and aviation arts and such use is within the scope of the invention.

Other uses and embodiments of the invention will be apparent to one skilled in the art and the invention is not to be limited by the illustrated examples shown and described, but is limited only by the following claims.

I claim:

1. In a power transmitting assembly, the combination comprising a support member, a power plant connected to said support member and having an output shaft extending therefrom, said power plant having a maximum torque output, a rotating load member connected to said support member at a location spaced from said power plant and having an input shaft extending therefrom, the axes of rotation of said output and input shafts being non-collinear and substantially intersecting at a point between said power plant and said load and remote from an imaginary line drawn between the extending ends of said input and output shafts, said axes having a relatively fixed angular relation to each other, a one piece solid shaft extending between said output and input shafts and connected at its ends to the corresponding ends of said output and input shafts for conjoint rotation therewith, and means carried by said assembly for applying a predetermined bending moment to the ends of said solid shaft to hold the same in a predetermined curved stationary shape during rotation of said shaft, said bending moment causing bending stresses in said solid shaft and said power plant torque output causing torsional shear stresses in said shaft less than the elastic limit of said solid shaft.

2. In a power transmitting connection, the combination comprising a support member, a power plant connected to said support member and having an output shaft extending therefrom, a rotating load member connected to said support member at a location spaced from said power plant and having an input shaft, the axes of rotation of said output and input shafts being noncollinear and substantially tangent to a common circle, a one piece solid shaft extending between said output and input shafts and connected at each end to a corresponding one of said output and input shafts for conjoint rotation therewith, and means carried by said power plant and said load for applying a predetermined bending moment to said solid shaft to hold the same substantially in an arc of said circle during rotation of said solid shaft by said power plant, said circular arc lying substantially in a plane fixed with respect to said power plant and said load member, said predetermined bending moment applying a bending stress on said shaft less than the elastic limit for said solid shaft.

3. In a motor vehicle, a support structure, a vehicle power plant attached to said support structure at one end of the vehicle and having a power output shaft extending therefrom, a drive axle member at the other end of the vehicle attached to said support structure and having an input shaft extending therefrom, said input and output shafts each inclined downwardly towards each other and with respect to said vehicle, a single one piece solid shaft extending between said input and output shafts, first means connecting one end of said solid shaft to said output shaft for torque transmittal therebetween and for simultaneously applying a predetermined bending moment on said one end of said solid shaft, and second means connecting the other end of said solid shaft to said input shaft for torque transmittal therebetween and for simultaneously applying a predetermined bending moment to said other end of said solid shaft, said bending moments holding said solid shaft in a predetermined stressed arcuate shape during rotation of said solid shaft, said solid shaft being held by said bending moments in a fixed plane, said bending moments applying a bending stress on said solid shaft less than the elastic limit of the same.

4. The motor vehicle of claim 3 wherein said first means comprises a flange connection between said power output shaft and said one end of said solid shaft, and said second means comprises a bearing and spline connections between said input shaft and said other end of said solid shaft.

5. In a motor vehicle, a support structure, a vehicle power plant attached to said support structure and having an output shaft extending therefrom, a drive axle member attached to said support structure and having an input shaft extending therefrom, said input and output shafts each inclined downwardly towards each other and at a relatively fixed predetermined angle with respect to said vehicle, a single one piece solid shaft connected at one end to said output shaft and at its other end to said input shaft, and means for applying a predetermined bending moment to each end of said solid shaft to hold the same in a predetermined curved shape during rotation of said solid shaft, said input shaft, output shaft and said solid shaft being continuously located in a common plane extending longitudinally of said vehicle during rotation of said shafts.

6. The motor vehicle of claim 5 wherein said bending moments applied to each end of said solid shaft are equal whereby bending stresses induced in said solid shaft by said bending moments are uniform throughout the length of said solid shaft.

7. In a motor vehicle, a support structure, a vehicle power plant attached to said support structure in the front of said vehicle and having an output shaft extending rearwardly therefrom, a combined transmission and differential axle attached to said support structure at the rear of said vehicle and having an input shaft extending forwardly therefrom, said input and output shafts each inclined downwardly at a fixed predetermined angle with respect to said vehicle, a single one piece solid shaft having one end axially aligned with and connected to said output shaft and at its other end axially aligned with and connected to said input shaft, and means for applying a predetermined bending moment to said solid shaft to hold the same in a predetermined nonlinear shape during transmission of drive from said power plant to said axle assembly by said solid shaft, said bending moment applying a bending stress on said shaft less than the elastic limit of the same.

8. In a vehicle, the combination comprising a power plant carried by the vehicle and having an output shaft extending therefrom, a rotating load member carried by the vehicle at a location spaced from said power plant and arranged to propel the vehicle, said load member having an input shaft, the center lines of said output and input shafts being non-collinear and intersecting at a point between said power plant and said load and remote from an imaginary line drawn between the extending ends of said input and output shafts, a one piece solid shaft extending between said output and input shafts and connected to said shafts for conjoint rotation, and means carried by said vehicle for applying a bending moment to said solid shaft to hold the same in a predetermined shape in a relatively fixed plane during rotation of said solid shaft, said power plant having a predetermined torque output for applying a maximum predetermined torsional stress on said solid shaft, said bending moment applying a predetermined maximum bending stress on said solid shaft, said torsional stress and said bending stress causing a maximum combined stress less than the endurance limit of said solid shaft.

9. A power transmitting connection for transmitting power between a driving shaft having a range of normal operating speeds between a predetermined maximum limit and minimum limit and a driven shaft, said driving and driven shafts having axes of rotation substantially located in a common plane and which intersect at a fixed angle and at a point substantially remote from an imaginary line drawn between the ends of said driving and driven shafts, a solid one piece shaft extending between the ends of said driving and driven shafts and connected to said shafts for power transmission therebetween, said solid shaft having a normal predetermined critical speed when in an unstressed straight condition, means for applying equal bending moments to the ends of said solid shaft to hold the same in a stressed arcuate shape substantially in said common plane, said solid shaft having an unstressed first mode critical speed in said range of normal operating speeds, said bending moment means operative to substantially change the first mode critical speed characteristics of said solid shaft to allow operation of said solid shaft at a speed equivalent to said unstressed first mode critical speed with negligible bending vibration.

10. In a vehicle having an engine with an output shaft operable between predetermined minimum and maximum operating speeds and a driving assembly having an input shaft, the combination including a power transmitting connection for transmitting power between said output shaft and said input shaft for propulsion of said vehicle, said output and input shafts having axes of rotation each inclined at a substantial angle with respect to an imaginary line drawn between the ends of said driving and driven shafts, a solid one piece shaft extending between the ends of said input and output shafts and connected to said shafts for power transmission therebetween, means for applying bending moments to the ends of said solid shaft to hold the same in a stressed arcuate shape substantially in said common plane, said solid shaft having a normal unstressed first mode critical speed between said maximum and minimum operating speeds, said bending moment means operative to change the first mode critical speed characteristics of said solid shaft to allow operation of said solid shaft at a speed equivalent to said unstressed first mode critical speed with negligible bending vibration.

11. The vehicle of claim 10 wherein said engine and said driving assembly are connected by means for preventing relative movement therebetween whereby said angles between said output and input shaft axes and said imaginary line is fixed.

12. In a motor vehicle having a front mounted engine and a rear mounted transmission, said engine having a downwardly and rearwardly extending crankshaft, said transmission having a downwardly and forwardly extending input shaft, a solid relatively flexible one piece drive shaft extending between said crankshaft and said input shaft and connected for transmission of drive between said engine and said transmission, means for holding said drive shaft in a curve extending between said crankshaft and said input shaft, said curve being substantially in a fixed plane, and a relatively rigid tube surrounding said drive shaft and rigidly secured to said engine and said transmission wherein said engine and said transmission are fixed relative to each other.

13. In a motor vehicle having an engine and a transmission located at opposite ends of the load carrying compartment of the vehicle, said engine and said transmission having axes of rotation inclined downwardly under said load compartment, a one piece solid shaft connecting said engine and said transmission for drive therebetween, means for holding said shaft in a fixed curve under said load compartment, said shaft having its engine end tangent to said engine axis and its transmission end tangent to said transmission axis, and a relatively rigid tube surrounding said shaft and rigidly connecting said engine and said transmission together as a unitary unit.

14. In a motor vehicle having a front mounted engine and a rear mounted transmission, a solid normally straight one piece shaft connecting said engine and said transmission for drive therebetween, said shaft having a length L, and a diameter D, said engine and said transmission having an output and input shaft respectively with axes of rotation inclined downwardly toward the center of the vehicle and intersecting at an angle $\alpha$ in radians, said length L, said diameter D and said angle $\alpha$ being chosen so that the quantity $$\sqrt{\frac{32}{3}\left(\frac{L\alpha}{D}\right)^2 + \frac{1}{3}(4\pi^2-\alpha^2)^2}$$

is greater than 31, and means for holding said shaft in a curved stressed condition between said engine and said transmission with its opposite ends coaxial with the axes of rotation of said engine and said transmission shafts.

15. A power transmission assembly including a rotary power plant and a rotatable load, said power plant and said load having an output and input shaft respectively with substantially fixed axes of rotation relative to each other and intersecting at a point between said power plant and load, a solid one-piece normally straight shaft extending between said power plant and load, means rigidly connecting said solid shaft with said power plant output shaft for drive thereby, means connecting said solid shaft and said load input shaft for drive thereof, means for holding said shaft in a curved position substantially in a plane with its opposite ends coaxial with the axes of said power plant output shaft and said load, said solid shaft having a length and diameter, and being curved at an angle such that the first mode resonant frequency $F_{n1}$ of said solid shaft in its plane of curvature is substantially greater than its first mode resonant frequency $F_{n2}$ in a plane normal to said plane of curvature, whereby said solid shaft may be operated at rotational speeds corresponding to either of said resonant frequencies without excessive bending vibration.

16. The assembly of claim 15 wherein said solid shaft is curved sufficiently to raise $F_{n2}$ to a value greater than $\sqrt{2}$ times $F_{n1}$.

17. In a motor vehicle having an engine and a transmission unit located at opposite ends of the vehicle, said engine and transmission having non-collinear axes of rotation that intersect at a point below either said engine or said transmission, a solid one-piece normally straight drive shaft extending between said engine and transmission, said engine having a crankshaft extending therefrom with a flange thereon, said drive shaft having a flange integral therewith, means rigidly connecting said crankshaft and drive shaft flanges for transmission of drive therebetween, said transmission unit having an input member having internal splines, said drive shaft having external splines meshing with said input member splines for transmission of rotational drive between said drive shaft and said transmission input member, a pair of spaced bearings surrounding the transmission end of said drive shaft inwardly of said splines, means fixedly supporting said bearings, said flanges and said bearings comprising means for holding said drive shaft in a stress curved position, the ends of said drive shaft being respectively coaxial with said crankshaft and said transmission input member.

18. In a motor vehicle, a support structure, a vehicle power plant attached to said support structure in the front of said vehicle and having an output shaft extending rearwardly therefrom, a combined transmission and differential axle attached to said support structure at the rear of said vehicle and having an input shaft extending forwardly therefrom, said input and output shafts each inclined downwardly at a fixed predetermined angle with respect to said vehicle, a single one piece solid shaft having one end axially aligned with and connected to said output shaft and its other end axially aligned with and connected to said input shaft, and means for applying a predetermined bending moment to said solid shaft to hold the same in a predetermined non-linear shape during transmission of drive from said power plant to said axle assembly by said solid shaft, said bending moment applying a bending stress on said shaft less than the elastic limit of the same.

References Cited in the file of this patent
UNITED STATES PATENTS

| | | |
|---|---|---|
| 1,897,542 | West | Feb. 14, 1933 |
| 2,001,167 | Swennes | May 14, 1935 |
| 2,168,108 | Bunau-Varilla | Aug. 1, 1939 |
| 2,195,647 | Guy | Apr. 2, 1940 |
| 2,240,317 | Swenson | Apr. 29, 1941 |
| 2,963,106 | Sampietro | Dec. 6, 1960 |

OTHER REFERENCES

Text: "Introduction to a Study of Mechanical Vibrations," by G. W. Van Santen; distributed by Elsevier Press Inc., 402 Lovett Blvd., Houston 6, Texas. Copy received in Patent Office Library on April 5, 1954 and filed under TA 355 S3iE; page 143 relied on.